Oct. 31, 1967     G. J. BANDEMER ET AL     3,349,492
ADJUSTABLE SPHERICAL CURVATURE CORRECTION DEVICE
Filed Aug. 12, 1966     4 Sheets-Sheet 1

INVENTORS
GEORGE J. BANDEMER,
CLYDE E. DRAPER
BY *Harry A. Herbert Jr.*
*Ruth Coder*
ATTORNEYS Oct. 31, 1967     G. J. BANDEMER ET AL     3,349,492
ADJUSTABLE SPHERICAL CURVATURE CORRECTION DEVICE
Filed Aug. 12, 1966     4 Sheets-Sheet 3

INVENTORS.
GEORGE J. BANDEMER,
CLYDE E. DRAPER
BY
ATTORNEYS

United States Patent Office 3,349,492
Patented Oct. 31, 1967

3,349,492
ADJUSTABLE SPHERICAL CURVATURE
CORRECTION DEVICE
George J. Bandemer, University City, Mo., and Clyde E. Draper, Columbia, Ill., assignors to the United States of America as represented by the Secretary of the Air Force
Filed Aug. 12, 1966, Ser. No. 572,159
12 Claims. (Cl. 33—20)

ABSTRACT OF THE DISCLOSURE

An elongated cam bar unit, having an upper profile adjustable to correspond proportionately to the earth curvature of the area being plotted, is pivoted to swing about the mapping area. A tracing base or table having a recording stylus and a floating deck having vertically adjustable and orificed back-lighted platen, comprise a unit mounted on the cam bar to move along its length and to swing with it about the mapping area. Sliding rod and sleeve connect the base and deck unit so that the deck is enabled to move vertically with respect to the base and follow the cam bar profile so that the illuminated point is always aligned with the stylus and moves with it.

---

The invention described herein may be manufactured and used by or for the United States Government for governmental purposes without payment to us of any royalty thereon.

The invention relates to photogrammetric plotting devices, and more particularly, to stereoscopic plotting instruments designed to compensate for earth curvature, and distortions arising from other causes. It is related to stereoscopic plotting instruments using the principle of optical projection of an image onto a flat surface to form a three-dimensional model with light of two colors, usually red for one projector and blue for another. When the projection is viewed through spectacles which have a blue lens for one eye and a red lens for the other, the variations in height or depth can be easily and clearly seen. The device is also usable for plotting images produced in one color by the usual stereopticon method.

Stereoscopic photogrammetric plotting instruments of this type are used extensively in charting the surface of the earth from aerial photographs, or for charting the surface of celestial bodies such as the Moon or Mars from photographs taken with astronomical telescopes either earth bound or at positions high above the surface of the earth.

As demands for greater charting accuracies increase, distortions that have been known to exist in the stereoscopic model become more significant and there is a greater need to compensate for them. These distortions are radial in nature and have the effect of displacing the actual horizontal position of points and contours and of producing vertical inaccuracies at the plotting surface. The resultant of these inaccuracies is the algebraic sum of the effect of each of the several distortions. The photographic taking conditions, which involve the camera, the altitude of the camera platform, the atmospheric conditions, and the curvature of the surface of the earth, or of the moon, as well as the optics of laboratory equipment, the optics of the stereoscopic projection plotter and the scale of the chart produce a resultant distortion which varies from one project to another and sometimes within the same project.

The object of the present invention is to provide a simple, adjustable and automatic means of compensating for the resultant of these distortions in one step.

A further object of the invention is the provision of a mapping device so constructed that the distortions above noted can be allowed to accumulate in the stereoscope model, and their resultant compensated all at one time and eliminated when transferred to the charting surface eliminating the necessity for compensating each distortion individually or with a separate technique, or modification of equipment, at the place where it happens to occur.

A further object of the invention is the provision of a device which can be used with existing stereoscopic photogrammetric plotting instruments without the necessity of rebuilding or re-designing them. It can be used to replace the base on standard tracing tables, and it can be readily removed from the tracing table and replaced by a straight bar to convert the tracing table back to conventional use when it is desirable to do so.

Another object of the invention is the provision of a device for the purposes outlined above which is sufficiently simple in its operation and application so that special training is not required for its proper use, and which can further lend itself to either mathematical solutions for setting the profile curve of the adjustable cam surface, or to empirical solutions of the problem in the presence of reliable plotting control.

A further advantage of the invention lies in the fact that it is readily adaptable to the tracing tables of stereoscopic photogrammetric plotting instruments using either space rods and swinging light sources such as the Kelsh type, or those using whole model light sources such as the Multiplex or Balplex types of projectors.

These and other advantages, features and objects of the invention will become more apparent from the following description taken in connection with the illustrative embodiments in the accompanying drawings, wherein:

FIGURE 5 is a fragmentary view in cross section of the flexible cam bar and its adjustments; and FIGURE 6 is a fragmentary view in perspective of the offset balance rod and its mountings.

Figure 3:
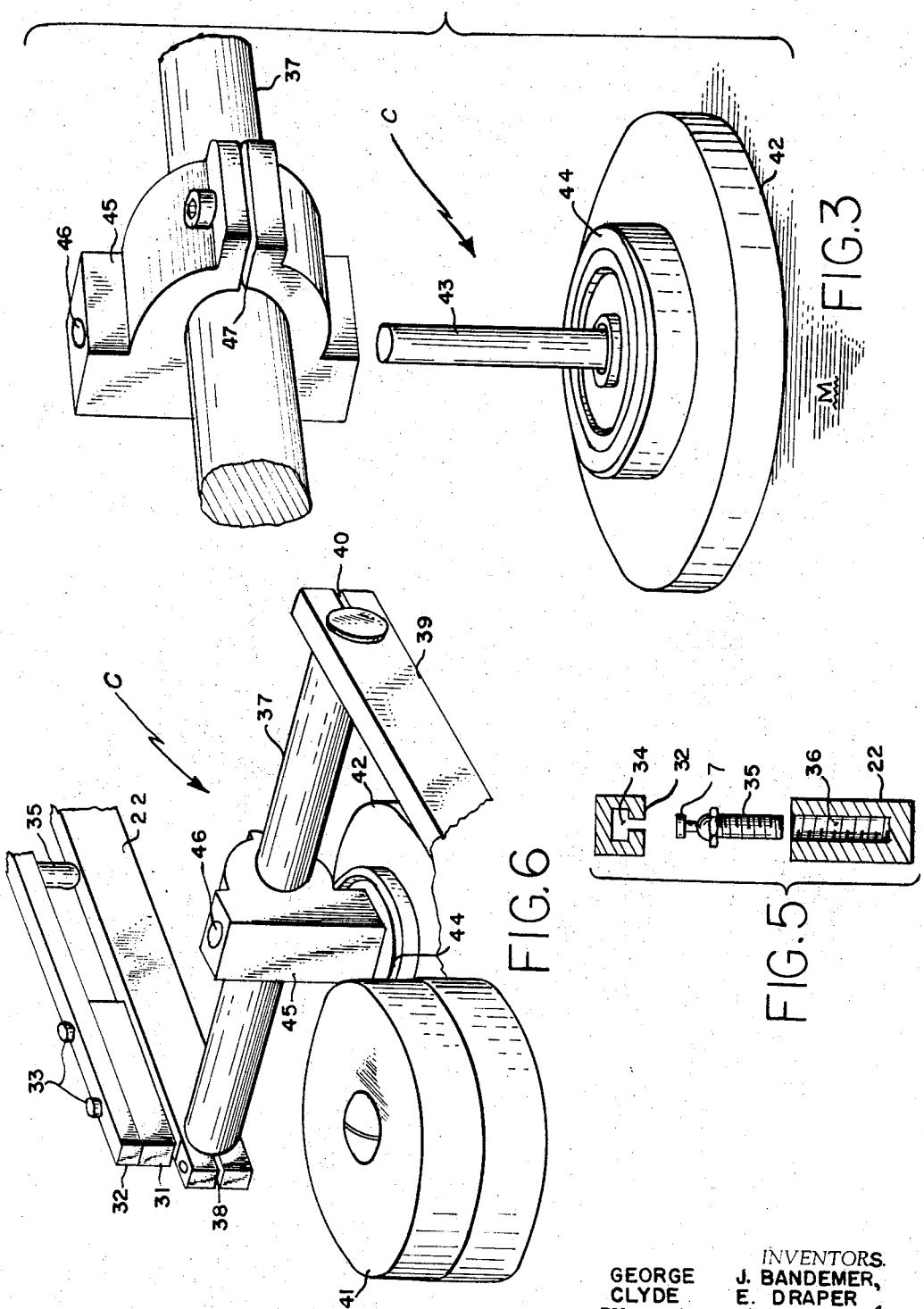
FIGURE 3 is an exploded view of the elements of the pivot assembly.
Figure 4:
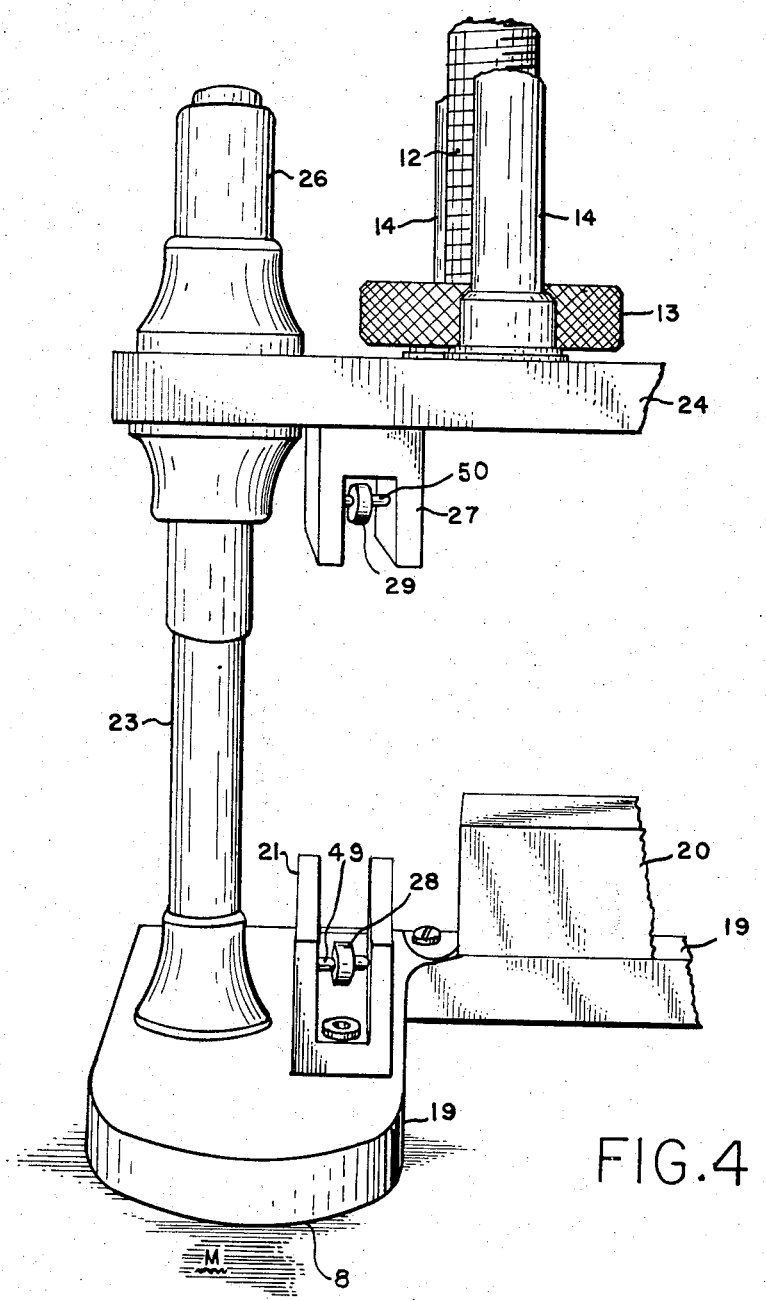
FIGURE 4 is a fragmentary view in perspective showing both channel guide elements and their rollers.

The invention has three assembly units: (1) a tracing table unit which holds the stylus and is movable about the mapping surface and which measures height or depth of any point in the model with respect to the mapping surface, (2) an adjustable bar cam assembly adjustable for accommodation for earth curvature, or distortions and (3) a pivot assembly of FIGURE 3. Each of these assemblies will be later described.

Figure 1:
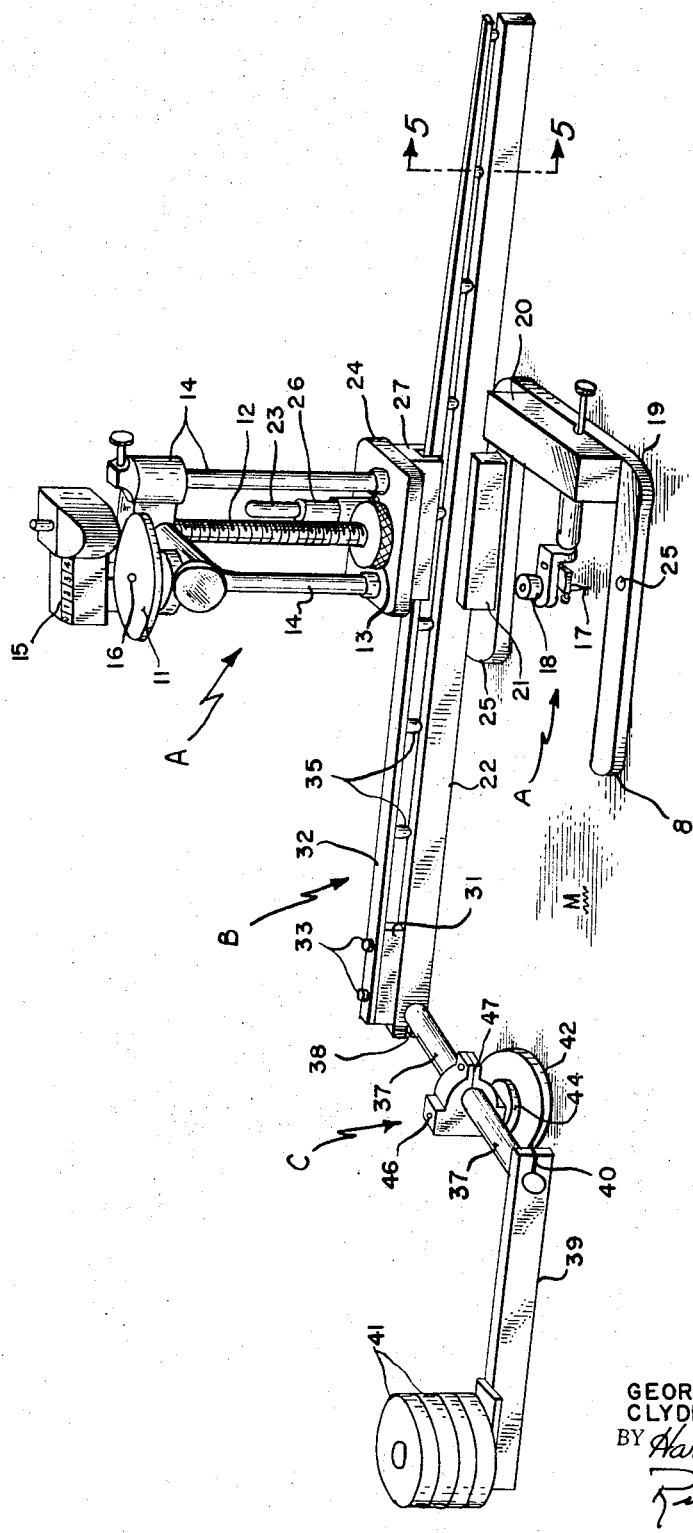
FIGURE 1 is a perspective view of the assembled device of the invention on which the upper portion of a standard type tracing table has been mounted and to the base of which a standard type pencil chuck has been affixed.
Figure 2:
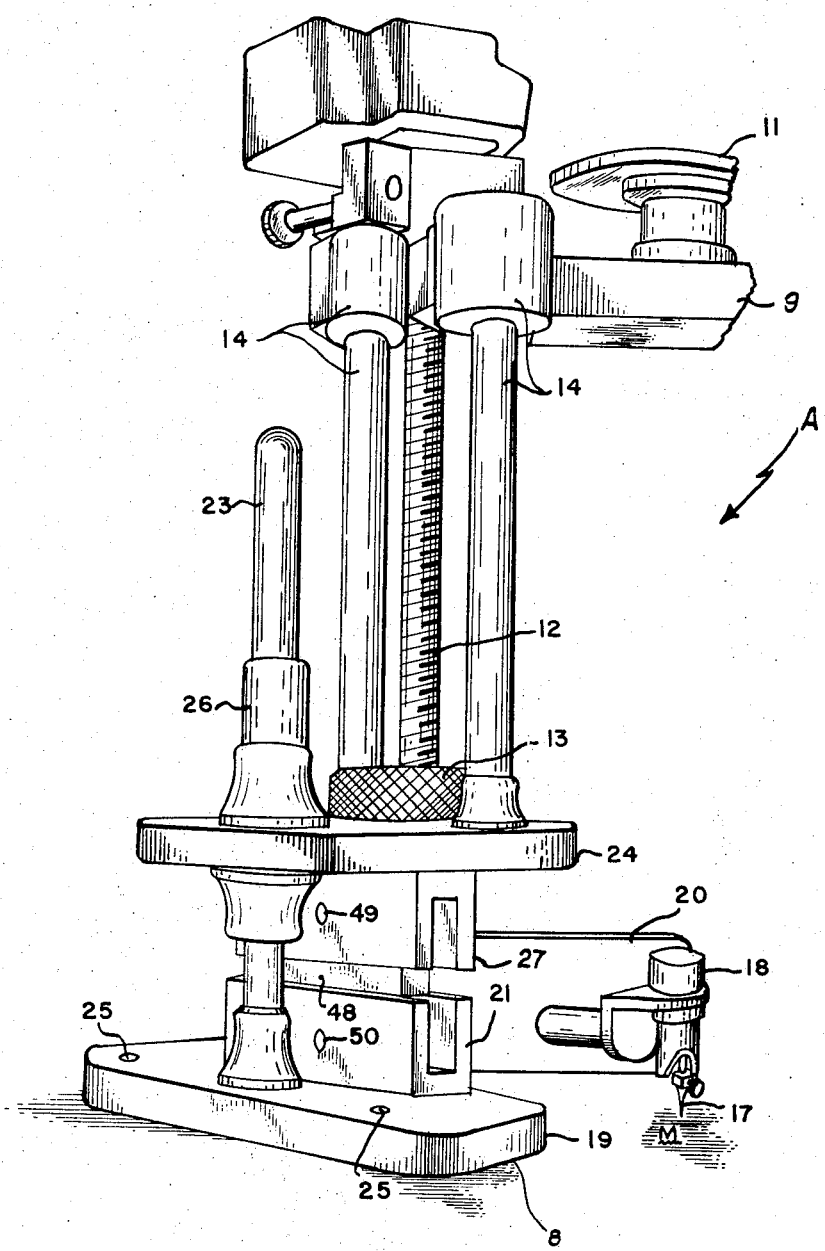
FIGURE 2 is a view of the device of the invention converted for standard use.

Referring more in detail to the drawings wherein like numerals indicate the same elements in each figure: a tracing table is indicated generally by the letter A. This instrument can measure the height or depth of any point in the model with respect to a reference surface such as the mapping surface M. A small flat circular surface or platen 11 is mounted on its upper portion. The platen 11 is mounted on a yoke 9 which can be raised or lowered by a threaded vertical rod 12 activated by a knurled knob 13 and kept aligned by two vertical rods and sleeve assemblies 14 (see FIGURES 1 and 2). The amount of vertical movement can be measured by a suitable scale or counter 15 calibrated in any desired units. A small, back-lighted orifice 16 in the center of the platen 11 forms a small point of light and creates a floating point which appears to be on, above or below the surface of the virtual image or model, depending on the elevation of the platen 11. The floating point thus formed can be placed on any point on the surface of the virtual image or model by moving the tracing table horizontally and raising or lowering the platen vertically. The horizontal position of the point can be marked on the plotting surface with a pencil point or other suitable recording stylus 17 held in place vertically below the floating point by the adjustable pencil chuck 18 which is mounted on the tracing table base 19, presently described.

The lines of equal elevation, that is, the contour lines within the model can be drawn on the chart or mapping surface by setting the illuminated floating point at a selected elevation by adjustment of the platen 11 and moving it horizontally so that it always remains on the surface of the model or image. The pencil point 17 will draw the contour lines as the tracing table is being moved. The pencil 18 is mounted on one arm or segment 8 of the horseshoe or U-shaped base 19 of the tracing table A by means of a block 20. A machined channel member 21 is also secured to the base 19, and serves as support for a bar 22. A fixed alignment is thus maintained between the base 19 and the bar 22. A vertical guide rod 23 is also mounted on the arm 8 of the base 19. A floating deck 24 is mounted for vertical sliding movement on a guide rod 23 and is maintained in a true horizontal by means of the vertical guide sleeve 26 as it moves upwardly or downwardly. The rod 23 assures that the base 19, and the floating deck 24, will move together along the cam bar 22–32 as a coordinated aligned unit, the floating deck rising and lowering along the cam profile. The cam profile is adjusted to be a proportionate image of the earth's curvature at the area being plotted, the center of which is the base plate 42. The level of the base 19 is adjustable by means of threaded support pads shown at 25.

The deck 24 is supported for sliding movement on the cam bar by means of a machined channel member 27 mounted on the lower surface of the floating deck 24. The profile of the cam bar is adjustable by means later described.

The position of the opening 16 governs the position of the floating illuminated point. The channel member 27 maintains proper alignment between the opening 16 on the platen 11, and the pencil point 17 as the whole assembly of tracing table or base 19 and floating deck 24 moves along the cam bar 22–32. For reducing friction and for providing unimpeded sliding movement of the cam bar 32 and the base bar 22, and to provide single point contacts, the channel members 21 and 27 are provided with bearings 28 and 29, respectively. The type of bearings shown are roller bearings mounted on axles 49 and 50, respectively, but it is to be understood that the invention is not limited to this specific type of bearing.

The bearing 29 of the upper channel member 27 supports the floating deck 24 on the adjustable surface of the cam bar 32, and as a cam follower, insures a single-point contact with the profile of the adjustable surface of the cam bar, as the tracing table is moved along the cam 32.

To satisfy one of the principles of photogrammetry, the assembly of the floating deck 24, the rod and sleeve assembly 23, 26 and base 19 must be such that the center line of the vertical rod 23, the centers 49 and 50 of the two rollers 28 and 29, the floating illuminated point and the pencil point 17 must be in the same plane, and this plane must be kept perpendicular to the lower edge of the cam base 22. The tracing table assembly is moved about the mapping surface M, supported by and moved along the cam bar 32. The cam assembly comprises the rigid base bar 22 which rests on the roller bearing 28 in the lower guide channel 21 and the flexible and adjustable cam bar 32. They are spaced and attached to each other by adjustable means which make it possible to alter the cam profile for compensation in the completed map for earth curvature and distortions which might arise from other origins. The cam bar profile is made adjustable as follows: A space block 31 is positioned between the end area of the cam bar 32 and that of the cam base 22 and secured to both by expedient means such as bolts 33. The cam 32 is a flexible metal bar of such cross section to accommodate the T or bayonet slot 34 (see FIGURE 5) milled along its entire length and having its open portion directed downwardly. Threaded adjustment bolts 35 are provided with T-heads 7 which are inserted into the slot 34 at its end and slide therein.

The bolts 35 are threaded into holes 36 placed at intervals along the upper edge of the cam base 22. By adjusting these bolts any necessary change can be made in the contour of the upper surface of the cam 32. It can be shaped to match the profile of the spherical or aspherical surface representing the resultant radial distortions in the stereoscopically produced image or model.

A rod 37 is secured to the cam base 22 in perpendicular relationship therewith by means of a slotted clamp-type hole 38 located at the same end of the base 22 as the spacer block 31 (FIGURE 6). The rod 37 passes through a pivot assembly, indicated generally by the designation C. The effective length of the rod 37 is equal to the distance in a horizontal plane from the cam bar to the vertical line between the floating point and the pencil point on the mapping surface. The pivot C, about which the whole tracing table moves supports the rod 37 at its midpoint.

The distal end of the rod 37 carries a counter-weight support arm 39, secured to it in 90° relationship by a slotted clamp 40 or other expedient securing means. The counter-weight support arm 39 carries suitable and selectable counter-weights 41. The length of the arm 39 and the counter-weights selected so that the bearing 28 supporting the weight of the cam bar is relieved of most of it. The arm 37 is supported from the level of the mapping surface by a support comprising a base plate 42 and a vertical pivot pin 43. (See FIGURE 3.) The pivot pin 43 carries a friction reducing bearing 44 which rests in the center of the upper surface of the base plate 42. A pivot block 45 is provided with a vertically extending opening 46 which accommodates the pivot pin 43 for easy pivoting of the block 45. The block 45 is also provided with a horizontally extending clamp-type opening 47 for the adjustment of the position of the pivot support along the length of the arm 37.

When compensation for curvature and distortions is not necessary, the flexible bar cam may be dispensed with. It may be replaced by the solid rectangular piece of metal 48 which converts the tracing table to the equivalent of a standard type tracing table (see FIGURE 2).

The invention, when properly assembled, aligned and calibrated, established two vertical planes, one plane is determined by the center of the cam roller, the floating point and the pencil point. It is kept vertical by the rod and sleeve assembly for any position of the floating point. The other is determined by the center pivot 43, the floating point and the pencil point, and it is kept vertical to the mapping surface by the vertical line between the floating point and the pencil point. Also, the two planes are kept perpendicular to each other by the cam guides 21 and 27 of both the base and the floating deck of the tracing table assembly; their line of intersection contains both the floating illuminated point and the pencil point 17. This arrangement of the entire assembly maintains the theoretically correct orientation of the pencil point with respect to the floating point for any position of the tracing table along the adjustable cam and for any elevation of the floating point.

The combination of the two motions, the pivoting of the cam 22 and the movement of the tracing table 19 along the cam 22 enables the operator to move the floating point anywhere in the model except for a small circular area at the center where the distortions are insignificant. This area can be plotted in the usual way without using the cam.

If the operator has the required sets of data and formulas, he can calculate the model distortion and then flex the bar into the correct profile by setting the adjusting bolts 35 with the aid of a height gauge or similar measuring device either separate from, or attached to, the tracing table 19. The center of the pivot 43 is then placed at the center of the model which has previously been leveled with the aid of horizontal and vertical control plotted on the manuscript base or mapping area M. He can then set the elevations he needs on the scale or counter and draw contours anywhere in the model by moving the tracing table 19 horizontally and, at the same time, keeping the floating point on the model or virtual image surface. By this invention, the contours will be automatically compensated for known distortions as the contours are being drawn. Supplementary spot elevations can also be determined by moving the tracing table along the adjustable cam and raising the floating point to the surface. The reading on the counter 15 will be the elevation of the point automatically corrected for the distortions already mentioned.

When the acquisition data is insufficient for calculating the profile, the operator can first set the counter or scale 15 to the correct elevation of the control points available, move the floating point to the control and set it on the model surface by flexing the bar 32 only. The flexible cam 32 can be adjusted to a very good approximation of the profile by this method since the spherical curvature of the referenced surface is already known. After the profile has been adjusted in this manner, the invention may be used as described above.

As a further example of the utility of the invention, when drawing contours, a good stereo plotter operator can confidently see 0.1 mm. change in elevation within the model. Starting at a large scale plot of about 1:10,000 the spherical curvature of the earth becomes apparent and measurable about 14 inches from the center of the model. As the plotting scale decreases measurable curvature approaches to about 1:50,000 the spherical curvature can be measured at 6.5 inches from the center of the model. In lunar charting with most recently acquired photographs, it becomes possible to plot, and contour elevations, from stereoscopic models at scales in the order of 1:1,000,000. In these cases a requirement existed for a device to automatically correct for the effects of the spherical surface. The device of the invention satisfies these requirements and can be used as an accessory for standard tracing table assemblies. The new type of base and the adjustable cam bar pivot about the center of the stereoscopic model and at the same time allow the tracing table or base to slide along it. When the tracing table is moved along the bar cam, which has been adjusted to match the profile of the spherical surface being plotted, its platen and floating point follow the shape of the cam. The two motions (pivoting the cam and sliding the tracing table along it) give sufficient freedom to cover the whole model without resetting, except for a circle at the center of the model about 1½ inches in diameter. In this small area curvature is so small that no correction is needed.

Although the invention has been described with reference to a particular embodiment, it will be understood to those skilled in the art that the invention is capable of a variety of alternative embodiments within the spirit and scope of the appended claims.

We claim:

1. An adjustable spherical curvature correction device comprising a base provided with a recording stylus and capable of movement about a mapping surface, a cam bar unit, said cam bar unit having an adjustable profile, and a floating deck, a rod and sliding sleeve connection between said deck and said base to allow vertical movement of said deck with respect to said base, a backlighted orificed platen carried by said deck and movable therewith, said cam bar unit being interposed between said base and said floating deck, means comprising a member attached to said floating deck and a similar member attached to said base for allowing sliding movement of said cam bar unit, and affording point support therefor.

2. A device as set forth in claim 1 wherein said cam bar unit comprises a base bar and a flexible bar cam, a spacing element connecting said base bar and said flexible cam bar adjacent an end of each, a series of adjustable spacing means interposed at intervals between said base bar and said bar cam for altering the space therebetween and thus altering the profile of said bar cam.

3. A device as set forth in claim 2 wherein said spacing means comprises a bayonet slot extending the length of the underneath surface of said bar cam, threaded adjustment bolts adapted to threadedly engage in openings distributed along the length of said base bar, a T-head on each of said bolts adapted to be inserted in the end of said bar cam and so slide in said slot for positioning and threading in said openings, each of said bolts being capable of individual adjustment to conform to a given profile prescribed for said cam bar.

4. A device as claimed in claim 1 wherein said means for allowing sliding movement of said cam bar with respect to said base and said floating deck comprises a channel member secured to said base, a roller bearing mounted in said channel member insuring point support for said base bar, an inverted channel member secured to the under surface of said floating deck and in parallel relationship to said first-mentioned channel member, a roller bearing in said last-mentioned channel member functioning as a cam follower with respect to said cam bar, and providing point support therefor.

5. In a device according to claim 4 a pivot assembly and support for an end of said cam bar unit, said pivot assembly and support comprising a counter-weighted arm secured to said cam bar unit and passing through and rigidly secured to a pivot block located midway the length of said arm, a pivot block mounted on a base plate, said base plate adapted to rest on a mapping surface, a vertically oriented pivot pin mounted for pivoting movement in said pivot block, a friction reducing bearing mounted on said base element for allowing pivoting movement of said counter-weighted arm, said cam unit, said mapping base, and said floating deck being capable of pivoting about said pivot pin as a center.

6. A device as claimed in claim 5 wherein two vertical planes are determined, one being established by the center of said roller bearings, a floating point established by said illuminated orificed platen and the point of said recording stylus, said plane being vertically maintained by a vertical rod and sliding sleeve connection between said base and said floating deck, the other being established by the pivot pin, the floating point, and the point of said stylus, said two planes being maintained in perpendicular relationship by said channel members.

7. In a device according to claim 1 a rod mounted on said base and extending vertically with respect thereto and extending through an opening in said floating deck and extending also through a guide sleeve mounted on said deck for satisfying photogrammetric principles.

8. A device as claimed in claim 1 wherein said cam bar unit may be replaced by a solid rectangular element entering each of said channel members, maintaining said channel members in alignment and allowing said device to function for stereoscopic charting where corrections for distortion and curvature can be dispensed with.

9. In a device as claimed in claim 1 a channel member secured to the under portion of said deck, a roller bearing in said channel member and operating as a cam follower to raise and lower said deck in response to the shape of said cam bar, leaving all elements of said device in their previously occupied positions.

10. A device for use with stereoscopic photogrammetric plotting instruments having a base and a movable orificed platen for effecting correction for earth curvature and inherent image distortions, said device comprising a counter-weighted cam bar unit, said unit comprising a base bar and a flexible cam bar, means for securing and spacing said base bar and said cam bar, said means being located at one end of said cam bar unit, a plurality of adjustable spacing means for altering the space between said base bar and said cam bar, said spacing means being located at intervals along the length of said cam bar unit, a pivot assembly located at the center of the image being plotted, and provided with a central pivot pin and a pivot block, adapted to be supported on said mapping table, an arm secured at one end to said cam bar unit, and perpendicularly offset therefrom in a horizontal plane, said arm being secured midway its ends to said pivot block and having a counter-weighted arm secured at its distal end, said counter-weighted arm being adapted to carry counter-weights of selected character for counterbalancing the weight of said cam bar unit.

11. A device according to claim 10 wherein said adjustable spacing means comprises a bayonet slot located on the underneath side of said cam bar and extending the entire length thereof, a plurality of threaded bolts, a T-head on each of said bolts, said bolts being adapted to engage threaded openings located in said base bar, and to engage also in said bayonet slot, each of said bolts being capable of individual adjustment for providing a predetermined profile of said flexible cam bar.

12. A curvature correction device for stereoscopic plotting instruments, said device comprising a base plate locatable at the center of the image to be mapped, a cam bar unit having an adjustable upper profile, adjustable to correspond proportionately to the earth curvature of the area being mapped, said cam bar having pivotal connection to said base plate to swing horizontally about said base plate as a center, a tracing table carrying a recording stylus, a floating deck carrying a vertically adjustable back-lighted platen, slidable rod and sleeve means for connecting said tracing table and said floating deck to allow independent vertical movement with respect to each other, said floating deck following the upper profile of said cam, said tracing table and said floating deck moving together as an aligned coordinated unit along said cam and pivoting with said cam bar about the mapping area, said platen having an orifice for creating a floating illuminated point, said platen being vertically adjustable on said floating deck to coordinate said floating illuminated point with said stylus.

References Cited
UNITED STATES PATENTS

| | | | |
|---|---|---|---|
| 2,336,550 | 12/1943 | Krumper | 33—177 X |
| 2,448,484 | 8/1948 | Cavalcanti | 33—20 |
| 3,296,699 | 1/1967 | McGivern | 33—20 |

HARRY N. HAROIAN, *Primary Examiner.*

LEONARD FORMAN, *Examiner.*